Jan. 19, 1926.
M. E. GOLDENSKY ET AL
1,570,479
SHOCK ABSORBER
Filed August 30, 1923
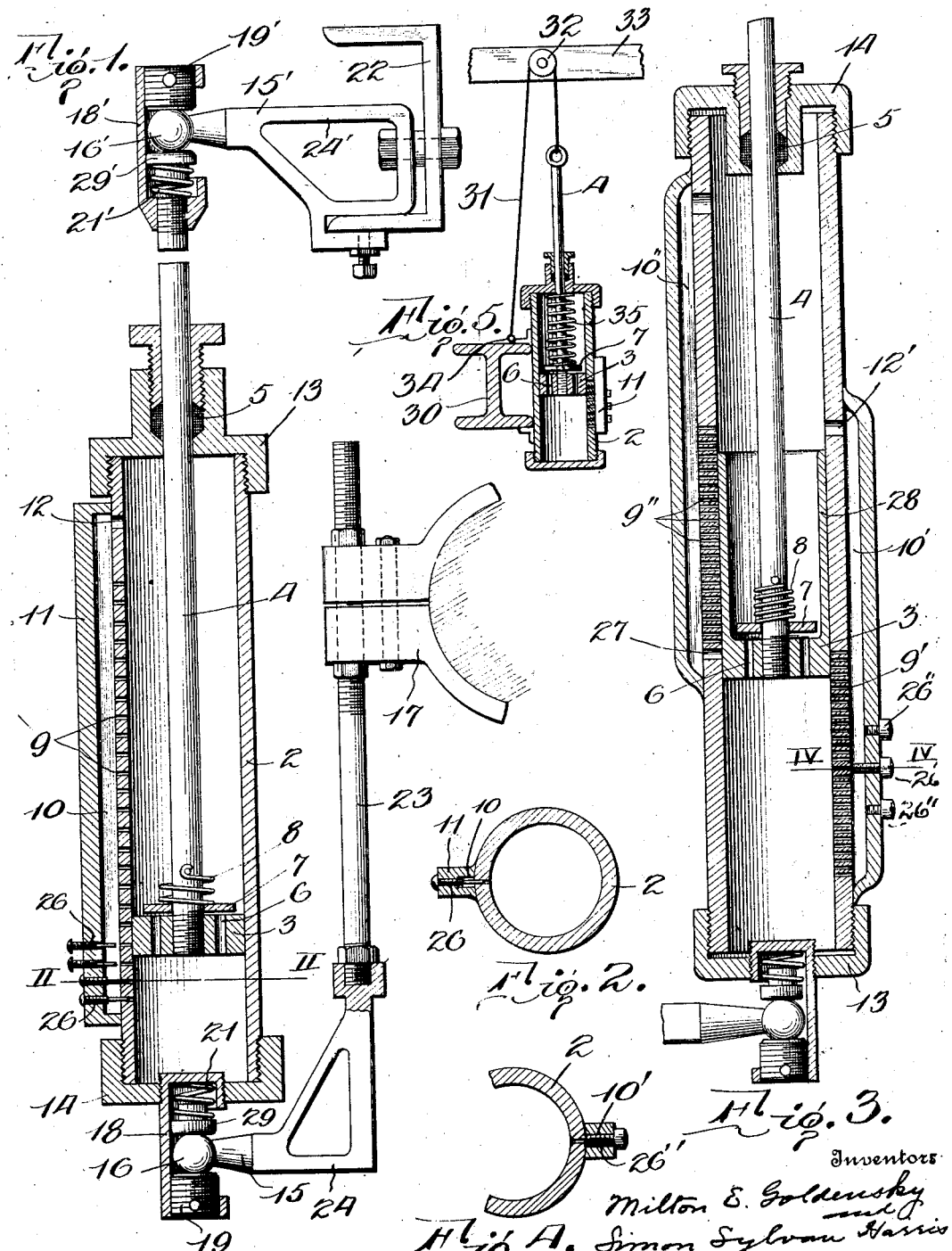
Inventors
Milton E. Goldensky
Simon Sylvan Harris
By John S. Barber
Attorney Patented Jan. 19, 1926.

1,570,479

UNITED STATES PATENT OFFICE.

MILTON E. GOLDENSKY AND SIMON SYLVAN HARRIS, OF PHILADELPHIA, PENNSYLVANIA.

SHOCK ABSORBER.

Application filed August 30, 1923. Serial No. 660,160.

*To all whom it may concern:*

Be it known that we, MILTON E. GOLDENSKY and SIMON SYLVAN HARRIS, citizens of the United States, residing at Philadelphia, Pennsylvania, have invented certain new and useful Improvements in Shock Absorbers, of which the following is a specification.

Our invention relates to shock absorbers, and while it is adapted to a wide variety of uses we have devised, and herein illustrated it, with reference to its being used in connection with motor vehicles.

In the accompanying drawings—

Fig. 1 is a longitudinal section of a shock absorber embodying our invention.

Fig. 2 is a cross sectional view taken on the line II—II of Fig. 1.

Fig. 3 is a longitudinal sectional view of a different embodiment of my invention from that shown in Fig. 1.

Fig. 4 is a cross sectional view taken on the line IV—IV of Fig. 2.

Fig. 5 is an elevation illustrating a different application of the invention from that shown in the other views.

Referring particularly to Figs. 1 and 2, 2 designates a cylinder in which is fitted a piston 3 supported upon a piston rod 4 passing through one head of the cylinder, where there is provided suitable packing 5. The piston is perforated, as at 6, and a valve 7 covers the perforation or perforations through the piston, the valve being held to its seat by a spring 8. The cylinder 2 is adapted to contain a suitable liquid, such as glycerine, and the valve 7 is arranged so as to permit the liquid to freely pass through the openings 7 when the piston is moved in one direction, as downwardly, but to prevent the passage of the liquid through the openings when it is attempted to move the piston in the opposite direction.

We provide a by-pass, connecting the spaces in the cylinder on opposite sides of the piston, such by-pass having restricted or small openings between it and the interior of the cylinder, which serve to prevent free flow of the liquid due to the movements of the piston. In the form of invention being described the wall of the cylinder is pierced with small holes 9, arranged in a longitudinal series, preferably parallel with the axis of the cylinder and the piston rod 4. These perforations open into a by-pass 10 of considerably larger cross sectional area than the area of any one of the perforations 9, and indeed larger than the aggregate area of any of such perforations as may be exposed and in operation at any one time. We prefer to form the by-pass 10 by securing, liquid tight and in any suitable manner, to the outside of the cylinder 2, a shell 11, the channel in which constitutes the by-pass 10.

12 is a comparatively large opening through the wall of the cylinder 2 communicating with the upper end of the by-pass 10 and affording a free passage for the movement of liquid at this point between the interior of the cylinder and the by-pass.

26, 26 are a series of screw-threaded plugs seated in the wall of the shell 11 and each adapted to close an opening 9. There are several of these arranged to close the lowermost and the next adjacent openings 9 and hence cut off, when desired, communication through these particular openings between the interior of the cylinder and the by-pass. By these means the effective length of the by-pass may be regulated for various lengths of piston travel.

The cylinder is preferably formed of a piece of tubing of proper size threaded at its opposite ends to receive the caps 13, 14. The cap 13 is provided with a neck to receive the piston rod packing 5. The cap at the other end of the cylinder is perforated to receive the connection between the cylinder and an arm 15 that connects the shock absorber with a member of the automobile, as for instance, with the axle, or the axle housing 17. The end of this arm is formed into a globular portion 16 that is adapted to enter a cylindrical coupling piece 18 which is screwed into the opening through such cap 14.

A plug 19 is screwed into the outer end of the cylindrical coupling piece 18 and its inner end bears against, and is shaped to fit, the cylindrical end of the arm 15. A movable bearing piece 29, located within the coupling 18, is held by a spring 21 against the face of the cylindrical head 16, opposite that engaging the plug 19, being shaped to fit such head. The upper end of the piston rod is connected with an arm 15' extending from a part of the vehicle, for instance, from the chassis or car frame 22, by a cylindrical coupling piece 18', quite similar to the piece 18 already described, its principal difference being that it is fitted to be screwed upon the end of the piston rod instead of into one of the closing caps of the cylinder. The corresponding parts of this coupling are designated by the same reference characters as have been employed in connection with the coupling already described, with the addition of the exponent prime to each.

Convenient means for attaching the arms 15, 15' to the vehicle are shown in Fig. 1, where 17 indicates the rear axle housing, 23 a rod, adjustably supported by the axle housing and depending therefrom, and 24 a bracket supported by the rod and carrying the arm 15. 24' designates a bracket bolted to the car frame 22 and carrying the arm 15'.

The operation of the shock absorbing device described is as follows: It is connected as shown with two parts of the automobile, the lower end with the axle housing or some part that is supported directly by the wheels, and the upper end with the car frame or some like part supported by the springs. The couplings located respectively between the arms 15, 15' and the shock absorber permit a limited amount of universal movement and are yielding to the desired extent. Any downward movement of the car relative to the axle forces the piston downward within the cylinder 2. This movement takes place freely, the liquid within the cylinder circulating directly through the piston, passing the valve 7, which is lifted against the action of the spring 8, when the piston moves in this direction. Upon the start of the return movement, or rebound, of the car body,—which is the movement that is most disastrous to the springs of the vehicle and most unpleasant to the occupants of the car,—the valve 7 closes and circulation of fluid through the passages 6 in the piston is cut off. The piston flow moves upwardly, under the stress of the springs of the vehicle, forcing the body of liquid above it through the passages 9 and 12, into the by-pass 10 from which it passes back into the cylinder below the piston. The piston, being at the lower end of its movement, possibly but one, and at the most but a few, of the passages 9 are below it and uncovered, and since the combined area of the passages for the flow of the liquid into the lower part of the cylinder is small, great resistance is offered to the flow of the liquid. This retards the upward movement of the piston, preventing a rapid rebound of parts. As, however, the piston slowly moves upward it successively uncovers more and more of the ports of the passages 9 thus gradually enlarging the area of the flow passages below the piston so that the movement of the piston may accelerate as it moves upwardly, or may be maintained at a practically uniform rate as the force of the vehicle springs diminish as they approach normal conditions. The rate of movement of the piston—whether fast or slow, or uniform or accelerated—may be determined by the size of the openings 9 and their location relative to each other.

By means of the closing plugs 26 the working length of the piston may be regulated to suit the style of car to which our invention may be applied, the length of spring movement, etc.

In Figs. 3 and 4 we have illustrated a form of the invention which, for some purposes, we prefer to that shown in Figs. 1 and 2. Many of the parts of the two forms of shock absorbers are the same, as for instance, the piston, the piston rod, the valve 7, the spring 8 and the closing caps 13 and 14 at the ends of the cylinder. The form shown in Fig. 3 differs from the other in that there are two independent by-passes 10', 10", arranged so that one, 10", is brought into operation directly after the other, 10', ceases to operate, the piston having passed the uppermost of the perforations 9' leading thereto. At the lower end of the upper by-pass 10", and directly below the lowermost of the openings 9" leading thereto, is a relatively large opening 27 of an area equal to the combined areas of the several passages 9' communicating with the other by-pass.

The piston head 3 is provided with a skirt 28 of such length that it will close the port to passage 12' leading into the upper end of by-pass 10' at the instant that the port to passage 27 leading to the lower end of by-pass 10" is uncovered by the piston.

Instead of employing a series of closing plugs one for each opening 9, as in the Fig. 1 construction, we may use a single screw-threaded plug 26' adapted to cut off entirely the by-pass 10', so as to reduce the effective working length of the cylinder. There are several screw-threaded apertures in the wall of the shell 11, as represented in Fig. 3, with any one of which the screw-threaded plug 26' may be made to engage. Those apertures not occupied by the plug 26' are closed by short plugs 26", the stems of which are so short as not to obstruct the passage 10'.

The operation of the shock absorber shown in Fig. 3 will now be stated. When the piston 3 has been forced downwardly, passing easily through the fluid in the cylinder 2, it comes opposite to and covers the passages 9' leading to the by-pass 10'. On the return movement of the piston, under the stress of the vehicle springs, the valve 7 closes the openings through the piston and the liquid within the cylinder is caused to circulate from the upper to the lower side of the piston through the by-pass 10' if the piston is to move. The operation in this case is exactly like that described in connection with the device shown in Fig. 1, the by-pass 10' being the only one now functioning. As the piston in its upward motion passes the uppermost of the series of openings 9' leading to the by-pass 10', it uncovers the opening 27, and the skirt of the piston closes the passage 12'. The passage 27 is equal to the combined area of all the passages 9' so that the piston moves with the same freedom as though the by-pass 9', which now ceases to function, were in use. Further upward movement of the piston gradually uncovers the openings 9" leading to the by-pass 10".

By locating the by-pass entirely on the outside of the cylinder 2 we are enabled to use for the latter stock tubing and to retain the true cylindrical inner surface thereof, with which the piston 3 engages, without disfiguring it by the cutting of channels or grooves, and without making necessary the use of added parts located within the confines of the cylinder in order to secure the restricted circulation of the liquid when the piston is on its upstroke. It is a simple mechanical operation to form the perforations that constitute the fluid-circulating passages between the interior of the cylinder and the by-pass, and their formation does not seriously mar the inner surface of the cylinder engaged by the piston. The straight holes 9, which may be formed by the usual metal boring tools, are the simplest form of passages between the cylinder and by-pass. It will be recognized, however, that the mechanical equivalents of the series of holes shown could be used in lieu thereof, as for instance, a narrow slit or a series of slits formed through the wall of the cylinder.

The terms "lowermost," "upward" and "downward" herein employed in speaking of the movements of piston 3, are used merely for the sake of convenience, although they are correctly descriptive of direction in referring to the shock absorber as it would ordinarily be applied to an automobile. As herein used, the term "downward" refers to that movement of the piston in which the fluid circulates freely through the passages 6 in the piston itself, while the term "upward" refers to the opposite movement of the piston in which the circulation is through the by-pass, and restricted.

The shock absorbing device described is of simple construction and easily manufactured, having few movable parts and none that are of delicate construction and likely to get out of order. It is not only adapted to be used in connection with automobiles as a shock absorber but wherever two parts of a mechanism have movements one with reference to the other which it is desirable should be cushioned or controlled in order to prevent motions which would result in shocks or strains, or otherwise modify the movements of the parts with which the device may be used.

The shock absorbing device may be applied between moving parts of mechanism or apparatus through motion-reducing connections such as illustrated in Fig. 5. Referring to this view it will be seen that the cylinder 2 is secured to a part, such as the axle 30, of a vehicle. A flexible band or connection 31 is secured at one end to the piston rod 4 whence it passes over a pulley 32 secured to a frame member 33 of the chassis of the vehicle and thence to the axle where its other end is connected at 34. In an arrangement such as this a spring 35 within the cylinder 2 bears upon the piston 3 and tends to restore it to its normal lowermost position.

What we claim is:—

1. In a shock absorber, the combination with a cylinder containing a liquid, a piston movable therein, and a valve controlled passage arranged to permit free movement of the liquid in the cylinder from one side of the piston to the other when the latter moves in one direction and to prevent such movement when the piston moves in the opposite direction, of a by-pass through which the liquid circulates from one side of the piston to the other as the piston is moving in the second mentioned direction, the by-pass having relatively free communication with the interior of the cylinder near that end of the cylinder toward which the piston moves when the flow of liquid through the said valve-controlled passage is prevented, and having communication with the other end of the cylinder through a series of small perforations arranged to be successively opened by the piston when moving in the other mentioned direction.

2. In a shock absorber, the combination with a cylinder containing a fluid, a piston movable therein and a valve-controlled passage arranged to permit free movement of the fluid through the piston when the latter travels in one direction, and to prevent such fluid movement through the piston when it travels in the other direction, of a by-pass through which the fluid circulates from one side of the piston to the other as the latter travels in the first mentioned direction, having restricted communication with that end of the interior of the cylinder toward which the piston moves as it completes its free, unobstructed, excursion, arranged to gradually increase in area as the piston returns from the end of its said excursion, and adjustable means for cutting off communication between the interior of the cylinder and that end of the by-pass just referred to, whereby the effective working length of the by-pass may be varied to suit the length of the excursion permitted to the piston.

3. In a shock absorber, the combination with a cylinder containing a fluid, a piston movable therein and a valve-controlled passage arranged to permit free movement of the fluid through the piston when the latter travels in one direction, and to prevent such fluid movement through the piston when it travels in the other direction, of a by-pass through which the fluid circulates from one side of the piston to the other as the latter travels in the first mentioned direction, communication between the by-pass and that end of the interior of the cylinder towards which the piston moves in completing its free, unobstructed, excursion being a series of perforations through the wall of the cylinder arranged to be successively passed by the piston in its travels, and means for cutting off one or more of the said perforations nearest the end of the by-pass at will, whereby the effective length of the by-pass may be varied to suit the length of the excursion permitted to the piston.

4. In a shock absorber, the combination with a cylinder containing a liquid, a piston movable therein and a valve controlled passage arranged to permit free movement of the liquid in the cylinder from one side of the piston to the other when the latter moves in one direction, as downwardly, and to prevent such movement when the piston moves in the opposite direction, as upwardly, of two by-passes, through which the liquid circulates from one side of the piston to the other, the by-passes being arranged to function in succession, and the first by-pass having relatively free communication with the cylinder toward its central part and restricted communications with the cylinder toward the lower end of the cylinder, the latter communications being arranged to offer great resistance to the passage of the piston as it starts its upward movement but to offer decreased resistance as the upward movement of the piston progresses and the second by-pass having relatively free communication with the interior of the cylinder towards its upper end and restricted communication with the central portions of the cylinder, the restricted communications being arranged to progressively offer less resistance to the passage of the liquid as the piston passes them in its upward movement.

5. The combination stated in claim 6 when the first opening to be passed by the piston in its upward movement communicating between the interior of the cylinder and the second by-pass is substantially equal in area to the combined areas of all the openings passed by the piston, leading to the first by-pass.

6. The combination with two parts of apparatus which have vibratory motions with relation to each other, and a shock absorbing device for modifying the said vibratory movements, of motion-reducing connections between the said two parts of the apparatus and the shock absorber arranged to reduce the amplitude of the movements of the parts of the shock absorber as compared with relative movements of the said vibratory parts of the apparatus.

7. The combination with two parts of apparatus adapted to have vibratory motions with relation to each other, of a shock absorbing device carried by one of the said parts, comprising a cylinder, a piston therein, and a resisting fluid medium, of motion-reducing connections between the said parts of the apparatus and the shock absorber, consisting of a flexible band connected at one end with the piston and at the other with one of the parts of the apparatus, and a pulley over which the said band passes carried by the other part of the apparatus.

MILTON E. GOLDENSKY.
SIMON SYLVAN HARRIS.